US012392065B2

(12) United States Patent
Ellis (10) Patent No.: US 12,392,065 B2
(45) Date of Patent: Aug. 19, 2025

(54) NONWOVEN FABRIC INCLUDING FIBERS FORMED FROM POST-CONSUMER RECYCLED PLASTIC (71) Applicant: Berry Global, Inc., Evansville, IN (US)

(72) Inventor: Dianne B. Ellis, Cary, NC (US)

(73) Assignee: MAGNERA CORPORATION, Charlotte, NC (US)

( * ) Notice: Subject to any disclaimer, the term of this patent is extended or adjusted under 35 U.S.C. 154(b) by 871 days.

(21) Appl. No.: 17/392,309

(22) Filed: Aug. 3, 2021

(65) Prior Publication Data
US 2022/0042222 A1 Feb. 10, 2022

Related U.S. Application Data (60) Provisional application No. 63/062,520, filed on Aug. 7, 2020.

(51) Int. Cl.
D04H 1/435 (2012.01)
D04H 1/425 (2012.01)
(Continued)

(52) U.S. Cl.
CPC .............. *D04H 1/435* (2013.01); *D04H 1/425* (2013.01); *D04H 1/4258* (2013.01); *D04H 1/4274* (2013.01); *D04H 1/43825* (2020.05); *D04H 1/43835* (2020.05); *D04H 1/46* (2013.01); *D04H 1/587* (2013.01); *D04H 1/64* (2013.01); *D04H 1/732* (2013.01); *D10B 2331/04* (2013.01); *D10B 2401/022* (2013.01); *D10B 2401/13* (2013.01); *D10B 2509/00* (2013.01); *Y02W 30/62* (2015.05); *Y10T 442/2525* (2015.04); *Y10T 442/2762* (2015.04);
(Continued)

(58) Field of Classification Search
None
See application file for complete search history.

(56) References Cited

U.S. PATENT DOCUMENTS 6,037,282 A * 3/2000 Milding ................. D04H 1/425
428/903.3
6,314,627 B1 11/2001 Ngai
(Continued)

FOREIGN PATENT DOCUMENTS

JP 3175026 B2 6/2001
JP 2003236320 A 8/2003
(Continued)

OTHER PUBLICATIONS

International Search Report and Written Opinion of corresponding international application No. PCT/US2021/044247 mailed on Oct. 26, 2021, all enclosed pages cited.
(Continued)

Primary Examiner — Arti Singh-Pandey
(74) Attorney, Agent, or Firm — BURR & FORMAN LLP (57) ABSTRACT Nonwoven fabrics are provided that include a mechanically entangled blend of fibers comprising (a) post-consumer recycled polymer staple fibers (PCR-staple fibers) and (b) one or more additional fibers, in which the one or more additional fibers are different than the PCR-staple fibers. The PCR-staple fibers are mechanically entangled with the one or more additional fibers to define the nonwoven fabric.

15 Claims, 3 Drawing Sheets (51) Int. Cl.
   *D04H 1/4258* (2012.01)
   *D04H 1/4274* (2012.01)
   *D04H 1/4382* (2012.01)
   *D04H 1/46* (2012.01)
   *D04H 1/587* (2012.01)
   *D04H 1/64* (2012.01)
   *D04H 1/732* (2012.01)

(52) U.S. Cl.
   CPC .... *Y10T 442/2861* (2015.04); *Y10T 442/2869* (2015.04); *Y10T 442/614* (2015.04); *Y10T 442/619* (2015.04)

(56) References Cited

U.S. PATENT DOCUMENTS

| | | |
|---|---|---|
| 6,735,833 B2 | 5/2004 | Putnam et al. |
| 6,903,034 B1 | 6/2005 | Putnam et al. |
| 7,091,140 B1 | 8/2006 | Ferencz et al. |
| 7,406,755 B2 | 8/2008 | Putnam et al. |
| 2006/0105154 A1 | 5/2006 | Sutton |
| 2010/0279085 A1 | 11/2010 | Adam et al. |
| 2015/0126949 A1 | 5/2015 | Ashraf et al. |
| 2018/0274143 A1 | 9/2018 | Wahlquist |
| 2019/0153643 A1 | 5/2019 | Ferrell et al. |

FOREIGN PATENT DOCUMENTS

| | | |
|---|---|---|
| JP | 2014132690 A | 7/2014 |
| WO | 1996006222 A1 | 2/1996 |
| WO | 2010125545 A2 | 11/2010 |

OTHER PUBLICATIONS

Second Written Opinion of corresponding international application No. PCT/US2021/044247 mailed on Jun. 23, 2022, all enclosed pages cited.

Third Written Opinion issued in corresponding international application No. PCT/US2021/044247 on Sep. 27, 2022, all enclosed pages cited.

International Preliminary Report on Patentability issued in corresponding international application No. PCT/US2021/044247 on Nov. 24, 2022, all enclosed pages cited.

Extended European Search Report issued in corresponding European Patent Application No. 24203913.9 mailed Dec. 2, 2024, all pages cited in its entirety.

Office Action (with English Translation) issued in corresponding Japanese Patent Application No. 2023-508037 mailed Apr. 1, 2025, all pages cited in its entirety.

* cited by examiner

NONWOVEN FABRIC INCLUDING FIBERS FORMED FROM POST-CONSUMER RECYCLED PLASTIC

CROSS-REFERENCE TO RELATED APPLICATIONS

This application claims priority under 35 U.S.C. § 119(e) to U.S. Provisional Application No. 63/062,520, filed Aug. 7, 2020, which is expressly incorporated by reference herein in its entirety.

TECHNICAL FIELD

Embodiments of the presently-disclosed invention relate generally to nonwoven fabrics including post-consumer recycled polymer staple fibers (PCR-staple fibers) that are mechanically entangled with one or more additional fibers (e.g., cellulosic fibers, wettable staple fibers, etc.). Embodiments of the presently-disclosed invention also generally relate to methods of making such nonwoven fabrics.

BACKGROUND

There has been increased interest in using recycled plastics in a variety of disposable products. Plastic recycling generally includes recovering scrap or waste plastic and reprocessing the material into useful products. Since the majority of plastic is non-biodegradable, recycling is part of global effort to reduce plastic waste that will either be burned, placed in a landfill, or find its way into one of the world's oceans. In some instances, the use of recycled plastics may be undesirably associated with products that exhibit reduced physical properties in comparison to products formed entirely from virgin plastics.

Therefore, there remains a need in the art for a nonwoven fabric, such as a wet wipe or a dry wipe, that includes fibers formed from post-consumer recycled (PCR) plastics. There also remains a need in the art for methods of making such PCR-containing nonwoven fabrics.

SUMMARY OF INVENTION

One or more embodiments of the invention may address one or more of the aforementioned problems. Certain embodiments according to the invention provide a nonwoven fabric including a mechanically entangled blend of fibers comprising (a) post-consumer recycled polymer staple fibers (PCR-staple fibers) and (b) one or more additional fibers, in which the one or more additional fibers are different than the PCR-staple fibers. In accordance with certain embodiments of the invention, the PCR-staple fibers are mechanically entangled (e.g., hydroentangled) with the one or more additional fibers to define the nonwoven fabric.

In another aspect, the present invention provides a method of forming a nonwoven fabric. In accordance with certain embodiments of the invention, the method may comprise the following: (ia) forming or providing a carded web comprising a blend of fibers comprising (a) post-consumer recycled polymer staple fibers (PCR-staple fibers) and (b) one or more additional fibers, in which the one or more additional fibers is different from the PCR-staple fibers; or (ib) forming or providing a first layer of post-consumer recycled polymer staple fibers (PCR-staple fibers) and forming or providing a second layer of one or more additional fibers, in which the first layer and the second layer are adjacent to provide a multilayer nonwoven web; and (ii) mechanically entangling the PCR-staple fibers and the one or more additional fibers to define a nonwoven fabric as described and disclosed herein.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to nonwoven fabrics containing a plurality of fibers formed from post-consumer recycled (PCR) plastics. In accordance with certain embodiments of the invention, the nonwoven fabrics may comprises PCR-staple fibers that are mechanically entangled (e.g., via hydroentanglement) with one or more additional fibers that are different than the PCR-staple fibers. For example, the one or more additional fibers may comprises a different polymeric composition, different length, different linear density, and/or different type of fiber (e.g., spunbond, meltblown, electrospun, melt-fibrillated, etc.). In accordance with certain embodiments of the invention, the one or more additional fibers may comprises natural and/or synthetic cellulosic fibers (e.g., pulp, tissue, viscose, rayon, etc.). In accordance with certain embodiments of the invention, the nonwoven fabrics may also comprise a binder, such as a binder that prevents or mitigates a disinfectant (e.g., chlorine disinfectant, a quaternary ammonium disinfectant, etc.) from attaching to the nonwoven fabric. In this regard, the nonwoven fabrics, in accordance with certain embodiments of the invention, prevent or mitigate the depletion of disinfectant concentration of a cleaning or sanitizing composition and/or facilitate release or application of a disinfectant from the nonwoven fabric onto a surface to be sanitized.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" may also include, in according to certain embodiments of the invention, polymers produced by fermentation process or biosourced. Additionally or alternatively, the term "polymer" or "polymeric" may comprise a biopolymer, such as polylactic acid (PLA), polyhydroxyalkanoates (PHA), and poly(hydroxycarboxylic) acids.

The term "cellulose fiber", as used herein, may comprise fibers including or formed from natural cellulose, regenerated cellulose (e.g., synthetic), and/or combinations thereof. For example, a "cellulose fiber" may be derived from hardwood trees, softwood trees, or a combination of hardwood and softwood trees prepared for use in, for example, a papermaking furnish and/or fluff pulp furnish by any known suitable digestion, refining, and bleaching operations. The cellulose fibers may comprise recycled fibers and/or virgin fibers. Recycled fibers differ from virgin fibers in that the fibers have gone through the drying process at least once. In certain embodiments, at least a portion of the cellulose fibers may be provided from non-woody herbaceous plants including, but not limited to, kenaf, cotton, hemp, jute, flax, sisal, or abaca. Cellulose fibers may, in certain embodiments of the invention, comprise either bleached or unbleached pulp fiber such as high yield pulps and/or mechanical pulps such as thermo-mechanical pulping (TMP), chemical-mechanical pulp (CMP), and bleached chemical-thermo-mechanical pulp BCTMP. In this regard, the term "pulp", as used herein, may comprise cellulose that has been subjected to processing treatments, such as thermal, chemical, and/or mechanical treatments. Cellulose fibers, according to certain embodiments of the invention, may comprise one or more pulp materials. In accordance with certain embodiments of the invention, the cellulose fibers may comprise a rayon, such as viscose.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process.

The terms "fabric" and "nonwoven fabric", as used herein, may comprise a web of fibers in which a plurality of the fibers are mechanically entangled or interconnected, fused together, and/or chemically bonded together. For example, a nonwoven web of individually laid fibers may be subjected to a bonding or consolidation process to bond at least a portion of the individually fibers together to form a coherent (e.g., united) web of interconnected fibers.

The term "consolidated" and "consolidation", as used herein, may comprise the bringing together of at least a portion of the fibers of a nonwoven web into closer proximity or attachment there-between (e.g., thermally fused together, chemically bonded together, and/or mechanically entangled together) to form a bonding site, or bonding sites, which function to increase the resistance to external forces (e.g., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., thermally fused together, chemically bonded together, and/or mechanically entangled together), such as by thermal bonding or mechanical entanglement (e.g., hydroentanglement) as merely a few examples. Such a web may be considered a "consolidated nonwoven", "nonwoven fabric" or simply as a "fabric" according to certain embodiments of the invention.

The term "post-consumer recycled material" as used herein, may comprise a polymeric material that originated from post-consumer sources such as domestic, distribution, retail, industrial, and demolition. For instance, "post-consumer recycled fibers" as used herein, may comprise fibers obtained from plastic consumer products that have been discarded for disposal or recovery after having completed their intended uses as a consumer product, including, for example, plastic containers (e.g., bottles) and plastic bags.

The term "staple fiber", as used herein, may comprise a cut fiber from a filament. In accordance with certain embodiments, any type of filament material may be used to form staple fibers. For example, staple fibers may comprise cellulosic fibers, polymeric fibers, and/or elastomeric fibers. Non-limiting examples of materials may comprise polyolefins (e.g., a polypropylene or polypropylene-containing copolymer), polyethylene terephthalates, and polyamides. Additional non-limiting examples of materials may comprise nylon, cotton, rayon, and wool. The average length of staple fibers may comprise, by way of example only, from about 2 centimeter to about 15 centimeter.

The term "continuous fiber", as used herein, may comprise a filament that has a high length-to-diameter aspect ratio (i.e., length : diameter) such as, for example, exceeding about 500,000:1, exceeding about 750,000:1, or exceeding about 1,000,000:1. In accordance with certain embodiments of the invention, the term "continuous fiber" may comprise a filament that is essentially endless in length.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous. It is noted that the spunbond used in certain composites of the invention may include a nonwoven described in the literature as SPIN-LACE®.

The term "bicomponent fibers", as used herein, may comprise fibers formed from two different polymeric materials or compositions extruded from separate extruders but spun together to form one fiber. The polymeric materials or polymers are arranged in a substantially constant position in distinct zones across the cross-section of the multi-component fibers and extend continuously along the length of the multi-component fibers. The configuration of such a multi-component fibers may be, for example, a sheath/core arrangement wherein one polymer is surrounded by another, an eccentric sheath/core arrangement, a side-by-side arrangement, a pie arrangement, or an "islands-in-the-sea" arrangement, each as is known in the art of multicomponent, including bicomponent, fibers.

The term "microfiber", as used herein, may comprise a multicomponent fiber that has been partially split to provide a plurality of smaller fiber portions, in which the smaller fiber portions may have a decitex (dtex) of 1.0 or below. In this regard, a microfiber may include at least a first group of split fibers or fiber portions and a second group of split fibers or fiber portions due to the complete or partial splitting or separation of individual segments from a pre-split multi-component fiber, in which the "split fibers or fiber portions" may comprise the portion of an individual segment of the multicomponent fiber that has been separated or split from the original splittable multicomponent fiber (e.g., having a dtex value of below 5, 4, 3, 2, etc.). In accordance with certain embodiments of the invention, the first group of split staple fibers may comprise a first polymeric material and the second group of split staple fibers may comprise a second polymeric material that is different than the first polymeric material. In this regard, microfibers have an increased surface area and a channel and/or pore containing structure that allows for capillary action to facilitate the uptake and/or absorption of fluid. Microfibers, as disclosed herein, may be distinguished by the bi-component staple fibers described herein by one or more of an increased porosity due to the presence of micro-pores and/or micro-channels in the microfiber while the bi-component staple fibers described herein are devoid or substantially devoid of micro-pores and/or micro-channels.

The term "crimp" or "crimped", as used herein, may comprise a two- or three-dimensional curl or bend such as, for example, a folded or compressed portion having an "L" configuration, a wave portion having a "zig-zag" configuration, or a curl portion such as a helical configuration. In accordance with certain embodiments of the invention, the term "crimp" or "crimped" does not include random two-dimensional waves or undulations in a fiber, such as those associated with normal lay-down of fibers in a melt-spinning process.

The term "machine direction" or "MD", as used herein, comprises the direction in which the fabric produced or conveyed. The term "cross-direction" or "CD", as used herein, comprises the direction of the fabric substantially perpendicular to the MD.

The term "layer", as used herein, may comprise a generally recognizable combination of similar material types and/or functions existing in the X-Y plane.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

In one aspect, the invention provides a nonwoven fabric including a mechanically entangled blend of fibers comprising (a) post-consumer recycled polymer staple fibers (PCR-staple fibers) and (b) one or more additional fibers, in which the one or more additional fibers are different than the PCR-staple fibers. In accordance with certain embodiments of the invention, the PCR-staple fibers are mechanically entangled (e.g., hydroentangled, needle-punched, air-entangled, etc.) with the one or more additional fibers to define the nonwoven fabric. In accordance with certain embodiments of the invention, the nonwoven fabric includes a unique combination of PCR-staple fibers entangled with, for example, one or more types or groups of additional fibers that may comprise a different polymeric composition, different length, different linear density, and/or different type of fiber (e.g., spunbond, meltblown, electrospun, melt-fibrillated, etc.) than those of the PCR-staple fibers. In accordance with certain embodiments of the invention, the one or more additional fibers may comprises natural and/or synthetic cellulosic fibers (e.g., pulp, tissue, viscose, rayon, etc.). In accordance with certain embodiments of the invention, the nonwoven fabrics may also comprise a binder, such as a binder that prevents or mitigates a disinfectant (e.g., chlorine disinfectant, a quaternary ammonium disinfectant, etc.) from attaching to the nonwoven fabric. In this regard, the nonwoven fabrics, in accordance with certain embodiments of the invention, prevent or mitigate the depletion of disinfectant concentration of a cleaning or sanitizing composition and/or facilitate release or application of a disinfectant from the nonwoven fabric onto a surface to be sanitized. In accordance with certain embodiments of the invention, the nonwoven fabric may comprise a three-dimensional pattern on at least one surface of the nonwoven fabric. For example, the three-dimensional pattern may comprise one or more recessed portions and a plurality of raised portions, in which the three-dimensional pattern may facilitate the sequestering or capture of loose debris located on a surface to be cleaned and/or sanitized.

In accordance with certain embodiments of the invention, the nonwoven fabric may comprise a basis weight from about 20 grams-per-square-meter (gsm) to about 200 gsm, such as about at most about any of the following: 200, 175, 150, 125, 100, 75, 60, and 50 gsm, and/or at least about any of the following: 20, 25, 30, 35, 40, 45, 50, 60, 70, 80, 90, 100, and 125 gsm.

In accordance with certain embodiments of the invention, the PCR-staple fibers may comprise a synthetic polymer or polymeric material. For example, the PCR-staple fibers may comprise a polyethylene terephthalate (PET), a polyolefin, a polyamide, or any combination thereof. For example, the PCR-staple fibers may comprise a post-consumer recycled polyethylene terephthalate (PCR-PET). In accordance with certain embodiments of the invention, the PCR-staple fibers may comprise a polyolefin. Examples of suitable polyolefin polymers include a polyethylene, a polypropylene, a copolymer thereof, or other forms of those polymers or blends of those polymers. For example, a polyethylene may comprise a low density polyethylene, a linear low density polyethylene, a medium density polyethylene, a high density polyethylene, or copolymers where ethylene is a major component. In certain embodiments of the invention, for example, the polypropylene may comprise a polypropylene homopolymer and a polypropylene copolymer.

The PCR-staple fibers may be provided by collecting, for example, municipal recyclable post-consumer waste (e.g., plastic bottles, synthetic nonwovens, etc.) and sorting the recyclable post-consumer waste into respective polymeric types of waste (e.g., PET in one pile, polypropylene in a second separate pile, etc.). The sorted recyclable post-consumer waste may be subjected to cleaning (e.g., rinsing with water to remove debris) and/or subjected to chemical treatment and/or mechanical processing to break the recyclable post-consumer waste into a plurality of smaller components (e.g., a grinding operation to reduce the recyclable post-consumer waste into flakes). The smaller components (e.g., about ¼" to about 2" flakes) of the recyclable post-consumer waste may then be melted and extruded into a plurality of fibers. The extruded fibers may be cut into staple fibers and/or subjected to crimping to impart one or more crimps into the fibers.

The PCR-staple fibers, in accordance with certain embodiments of the invention, may have an average length from about 20 to about 150 mm, such as at least about any of the following: 20, 25, 30, 35, 40, 45, 50, 60, 70, 80, and 90 mm, and/or at most about any of the following: 150, 125, 100, 90, and 80 mm. The average linear density of the PCR-staple fibers may range from about 1 to about 2.5 decitex (dtex), such as at least about any of the following: 1, 1.1, 1.2, 1.3, 1.4, 1.5, 1.6, 1.7, and 1.8 dtex, and/or at most about any of the following: 2.5, 2.4, 2.3, 2.2, 2.1, 2.0, 1.9, and 1.8 dtex.

The PCR-staple fibers, in accordance with certain embodiments of the invention, may comprise crimped PCR-staple fibers. For example, the crimped PCR-staple fibers may comprise an average from about 3 to about 20 crimps per 25 mm of fiber length, such as at least about any of the following: 3, 4, 5, 6, 7, 8, 9, 10, 11, and 12 crimps per 25 mm of fiber length, and/or at most about any of the following: 20, 19, 18, 17, 16, 15, 14, 13, and 12 crimps per 25 mm of fiber length.

In accordance with certain embodiments of the invention, the one or more additional fibers comprise wettable staple fibers; bicomponent staple fibers, such as splittable bicomponent fibers or non-splittable bicomponent fibers; microfiber staple fibers; cellulosic fibers; meltblown fibers; continuous spunbond fibers; or any combination thereof. The one or more additional fibers, for example, may comprise a plurality of wettable staple fibers. Wettable staple fibers, for example, may comprise a hydrophilic-modified polyester staple fibers. In accordance with certain embodiments of the invention, the hydrophilic-modified polyester staple fibers comprise a hydrophilic finish coated thereon. The wettable staple fibers, in accordance with certain embodiments of the invention, comprise hydrophilic-modified polyester staple fibers are different from the PCR-staple fiber (e.g., PCR-PET staple fibers) of the nonwoven fabric, which may be devoid of any hydrophilic modification (e.g., devoid of a hydrophilic finished coating thereon) and may be generally hydrophobic in nature. Hydrophilic-modified polyester staple fibers are commercially available from DAK Americas LLC under the trade name Delcron® Hydrotec Fiber.

In accordance with certain embodiments of the invention, the one or more additional fibers comprise a plurality of cellulosic fibers, such as natural and/or synthetic cellulosic fibers. In accordance with certain embodiments of the invention, the cellulosic fibers may comprise rayon, pulp (e.g., airlaid pulp), tissue, or any combination thereof. For example, the nonwoven fabric may comprise PCR-staple fibers, wettable staple fibers, and cellulosic fibers (e.g., rayon) that are mechanically entangled with each other.

In accordance with certain embodiments of the invention, the one or more additional fibers may comprise continuous fibers, such as continuous spunbond fibers formed from a synthetic polymer. By way of example only, the synthetic polymer may comprise a polyolefin, a polyester, a polyamide, or any combination thereof. In accordance with certain embodiments the continuous fibers may be located more predominately on one or both of the outermost surfaces of the nonwoven fabric. Alternatively, the one or more continuous fibers may be located more predominately in the middle of the nonwoven fabric in the z-direction of the nonwoven fabric, which is perpendicular to the machine direction and cross-direction of the nonwoven fabric. The nonwoven fabric, for example, may comprise a plurality of continuous fibers, such as spunbond fibers, mechanically entangled with at least the PCR-staple fibers via a hydroentanglement process to define the nonwoven fabric.

In accordance with certain embodiments of the invention, the PCR-staple fibers comprise from about 10% to about 90% by weight of the nonwoven fabric, such as at least about any of the following: 10, 15, 20, 25, 30, 35, 40, 45, 50, 55, and 60% by weight of the nonwoven fabric, and/or at most about any of the following: 90, 85, 80, 75, 70, 65, and 60% by weight of the nonwoven fabric.

In accordance with certain embodiments of the invention, the wettable staple fibers (if present) comprise from about 10% to about 90% by weight of the nonwoven fabric, such as at least about any of the following: 10, 15, 20, 25, 30, 35, 40, 45, 50, 55, and 60% by weight of the nonwoven fabric, and/or at most about any of the following: 90, 85, 80, 75, 70, 65, and 60% by weight of the nonwoven fabric.

In accordance with certain embodiments of the invention, the plurality of cellulosic fibers (if present) comprise from about 10% to about 90% by weight of the nonwoven fabric, such as at least about any of the following: 10, 15, 20, 25, 30, 35, 40, 45, 50, 55, and 60% by weight of the nonwoven fabric, and/or at most about any of the following: 90, 85, 80, 75, 70, 65, and 60% by weight of the nonwoven fabric.

In accordance with certain embodiments of the invention, the bicomponent staple fibers (if present) comprise from about 10% to about 90% by weight of the nonwoven fabric, such as at least about any of the following: 10, 15, 20, 25, 30, 35, 40, 45, 50, 55, and 60% by weight of the nonwoven fabric, and/or at most about any of the following: 90, 85, 80, 75, 70, 65, and 60% by weight of the nonwoven fabric.

In accordance with certain embodiments of the invention, the microfiber staple fibers (if present) comprise from about 10% to about 90% by weight of the nonwoven fabric, such as at least about any of the following: 10, 15, 20, 25, 30, 35, 40, 45, 50, 55, and 60% by weight of the nonwoven fabric, and/or at most about any of the following: 90, 85, 80, 75, 70, 65, and 60% by weight of the nonwoven fabric.

The nonwoven fabric, in accordance with certain embodiments of the invention, may have a first ratio between the PCR-staple fibers in grams per square meter of the nonwoven fabric and the plurality of wettable staple fibers in grams per square meter of the nonwoven fabric from about 4:1 to about 1:4, such as at most about any of the following: 4:1, 3.5:1, 3:1, 2.5:1, 2:1, 1.5:1, and 1:1, and/or at least about any of the following: 1:4, 1:3.5, 1:3, 1:2.5, 1:2, 1:1.5, and 1:1.

The nonwoven fabric, in accordance with certain embodiments of the invention, may have a second ratio between the plurality of cellulosic fibers in grams per square meter of the nonwoven fabric and the PCR-staple fibers in grams per square meter of the nonwoven fabric from about 4:1 to about 1:4, such as at most about any of the following: 4:1, 3.5:1, 3:1, 2.5:1, 2:1, 1.5:1, and 1:1, and/or at least about any of the following: 1:4, 1:3.5, 1:3, 1:2.5, 1:2, 1:1.5, and 1:1.

The nonwoven fabric, in accordance with certain embodiments of the invention, may have a third ratio between the plurality of bicomonent fibers in grams per square meter of the nonwoven fabric and the PCR-staple fibers in grams per square meter of the nonwoven fabric from about 4:1 to about 1:4, such as at most about any of the following: 4:1, 3.5:1, 3:1, 2.5:1, 2:1, 1.5:1, and 1:1, and/or at least about any of the following: 1:4, 1:3.5, 1:3, 1:2.5, 1:2, 1:1.5, and 1:1.

The nonwoven fabric, in accordance with certain embodiments of the invention, may have a fourth ratio between the plurality of microfibers in grams per square meter of the nonwoven fabric and the PCR-staple fibers in grams per square meter of the nonwoven fabric from about 4:1 to about 1:4, such as at most about any of the following: 4:1, 3.5:1, 3:1, 2.5:1, 2:1, 1.5:1, and 1:1, and/or at least about any of the following: 1:4, 1:3.5, 1:3, 1:2.5, 1:2, 1:1.5, and 1:1.

In accordance with certain embodiments of the invention, the nonwoven fabric may comprise a component weight ratio between the PCR-staple fibers in grams per square meter of the nonwoven fabric, the wettable staple fibers in grams per square meter of the nonwoven fabric, and the plurality of cellulosic fibers or the plurality of microfiber staple fibers in grams per square meter of the nonwoven fabric according to the formula A:B:C, wherein (i) 'A' represents the PCR-staple fibers in grams per square meter of the nonwoven fabric and comprises a value from about 0.2 to about 0.8, such as at least about any of the following: 0.2, 0.25, 0.3, 0.35, 0.4, and 0.5 and/or at most about any of the following: 0.8, 0.75, 0.7, 0.65, 0.6, 0.55, and 0.5;

(ii) 'B' represents the wettable staple fibers in grams per square meter of the nonwoven fabric and comprises a value from about 0.2 to about 0.8, such as at least about any of the following: 0.2, 0.25, 0.3, 0.35, 0.4, and 0.5 and/or at most about any of the following: 0.8, 0.75, 0.7, 0.65, 0.6, 0.55, and 0.5; and (iii) 'C' represents is the plurality of cellulosic fibers or the plurality of microfiber staple fibers in grams per square meter of the nonwoven fabric and comprises a value from about 0.2 to about 0.8, such as at least about any of the following: 0.2, 0.25, 0.3, 0.35, 0.4, and 0.5 and/or at most about any of the following: 0.8, 0.75, 0.7, 0.65, 0.6, 0.55, and 0.5.

In accordance with certain embodiments of the invention, the microfiber staple fibers (if present) comprise natural fibers, synthetic fibers, or a combinations thereof. The microfiber staple fibers, for instance, may comprise a denier value of 1 or less, such as at most about any of the following: 1.0, 0.9, 0.8, 0.7, 0.6, and 0.5 and/or at least about any of the following: 0.3, 0.4, 0.5, 0.6, 0.7, and 0.8.

In accordance with certain embodiments of the invention, the nonwoven fabric may comprise a binder applied thereon. For example, the binder may comprise a cationic binder, an anionic binder, or a non-ionic binder depending the one desired end-use of the nonwoven fabric. The binder, for example, may comprise a cationic polymer, such as a water-soluble cationic polymer. In accordance with certain embodiments of the invention, the cationic polymer may comprise a cationic polyamine including a backbone comprising a cationic amine group. In accordance with certain embodiments, for instance, the cationic polyamine may have a backbone comprising a cationic amine group. In other embodiments, for example, the cationic polyamine may have at least one side chain comprising a cationic amine group. In accordance with certain embodiments of the invention, for instance, the cationic additive may comprise a cationic polyamine blended with bis(hexamethylene)triamine (e.g., ASTRO FIX® 727 from Astro American Chemical Company, 557 South Woods Dr., Fountain Inn, S.C. 29644). According to certain embodiments of the invention, for example, the cationic polymer may define a cationic coating. In accordance with certain embodiments of the invention, for example, the binder may comprise a nonionic modified siloxane additive, which may be hydrophilic. In some embodiments for instance, the nonionic modified siloxane additive may comprise a nonionic modified polyorganosiloxane. In certain embodiments, for example, the nonionic modified siloxane additive may comprise a polyoxyalkyl-modified polydimethyl siloxan.e. In some embodiments, for instance, the nonionic modified siloxane additive may comprise a polyoxyalkyl (C2-C8) polydimethyl siloxane. In such embodiments, for example, the nonionic modified siloxane additive may comprise a polyoxyalkyl (C2-C4) polydimethyl siloxane (e.g., SILASTOL® 186 F from Schill+Seilacher GmbH, Schönaicher Straβe 205, 71032 Böblingen, Germany). In accordance with certain embodiments of the invention, the binder may be applied to the nonwoven fabric, by way of example only, via one or more of a spray nozzle, a foam applicator, a pad, or a kiss roll. Non-limiting examples of suitable binders that may be used, in accordance with certain embodiments of the invention, include acrylic binders, styrene-butadiene binders, ethylene-vinyl-acetate binders, ethylene vinyl emulsions (e.g., Sunbond 140N, Dur-O-Set E-646, and Unibond 2850), or any combination thereof In accordance with certain embodiments of the invention, the binder may comprise from about 1 to about 20 wt. % of the nonwoven fabric, such as at least about any of the following: 1, 3, 5, 6, 8, 9, 10, and 12 wt. % of the nonwoven fabric, and/or at most about any of the following: 20, 18, 16, 15, 12, and 10 wt. % of the nonwoven fabric.

Figure 1:
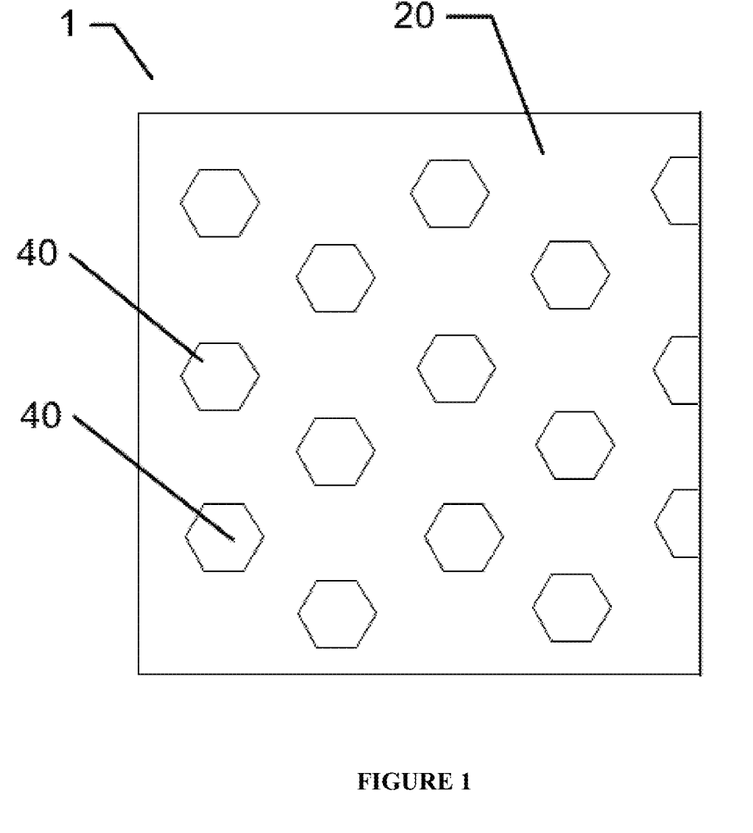
FIG. 1 illustrates a nonwoven fabric having a three-dimensional pattern comprising a single continuous recessed portion and the plurality of raised portions comprising islands within the single continuous recessed portion in accordance with certain embodiments of the invention.
Figure 2:
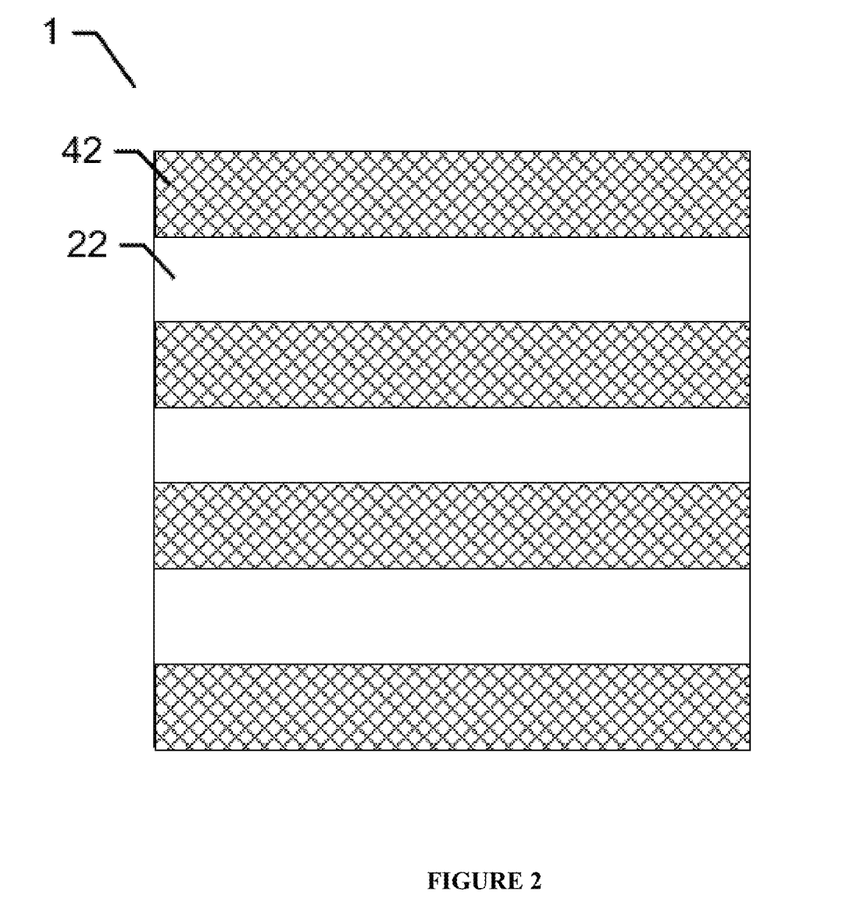
FIG. 2 illustrates a nonwoven fabric having a three-dimensional pattern comprising a plurality of recessed portions and a plurality of raised portions in accordance with certain embodiments of the invention.

In accordance with certain embodiments of the invention, the nonwoven fabric may also comprise one or more antimicrobial compounds. For instance, the antimicrobial compound may be embedded within the binder or binder mix, topically applied to nonwoven fabric prior to application of the binder, or both. In accordance with certain embodiments of the invention, the antimicrobial compound may include, by way of example only, silver-based antimicrobials, copper-based antimicrobials, zinc-based antimicrobials, and any combinations thereof In accordance with certain embodiments of the invention, the nonwoven fabric comprises a three-dimensional pattern formed on at least one surface of the nonwoven fabric. For instance, the three-dimensional pattern may comprise at least one recessed portion and a plurality of raised portions. As shown in FIG. 1, for example, the nonwoven fabric 1 may have a three-dimensional pattern comprising a single continuous recessed portion 20 and the plurality of raised portions 40 comprising islands within the single continuous recessed portion. Alternatively, the three-dimensional pattern comprises a plurality of recessed portions and a plurality of raised portions. As shown in FIG. 2, for example, a nonwoven fabric 1 may have a three-dimensional pattern comprising a plurality of recessed portions 22 and a plurality of raised portions 42. The plurality of recessed portions, for example, may comprise a plurality of individual recessed portions being separate and distinct from each other. For instance, the three-dimensional pattern may comprise alternating ridges and recessed portions.

In accordance with certain embodiments of the invention, the at least one recessed portion comprises an average depth from about 1.0 mm to about 3 mm, such as at most about any of the following: 3.0, 2.9, 2.8, 2.7, 2.6, 2.5, 2.4, 2.3, 2.2, 2.1, and 2.0 mm and/or at least about any of the following: 1.0, 1.1, 1.2, 1.3, 1.4, 1.5, 1.6, 1.7, 1.8, 1.9, and 2.0 mm. In accordance with certain embodiments of the invention, the average width (e.g., shortest dimension perpendicular to the z-direction of the nonwoven fabric) of the plurality of recessed portions may comprise from about 0.25 mm to about 1.8 mm, such as at most about any of the following: 1.8, 1.7, 1.6, 1.5, 1.4, 1.3, 1.2, 1.1, 1.0, 0.9, and 0.8 mm and/or at least about any of the following: 0.25, 0.3, 0.4, 0.5, 0.6, 0.7, 0.8, 0.9, 1.0, 1.1, 1.2, and 1.3 mm. In accordance with certain embodiments of the invention, the average length (e.g., longest dimension perpendicular to the z-direction of the nonwoven fabric) of the plurality of the recessed portions may extend continuously along the entire length of the nonwoven fabric (e.g., either in the machine direction or the cross-direction) or at least be from about 2 times, 3 times, 5 times, 10 times, 20 times, 50 times, or 100 times the average width of the plurality of recessed portions. In accordance with certain embodiments of the invention, the plurality of recessed portions may be separated by individual ridges (e.g., alternating ridges and recessed portions). The individual ridges, for example, may have an average ridge-width from about 1.5 mm to about 4.0 mm, such as at most about any of the following: 4.0, 3.8, 3.6, 3.4, 3.2, 3.0, 2.9, 2.8, 2.7, 2.6, 2.5, 2.4, 2.3, 2.2, 2.1, and 2.0 mm and/or at least about any of the following: 1.5, 1.6, 1.7, 1.8, 1.9, and 2.0 mm.

In accordance with certain embodiments of the invention, the nonwoven fabric is provided in a form of individual wipes or a continuous wipe with a plurality of perforations denoting lines of weakness such that individual wipes may be separated from the continuous wipe, which may be disposed within a package.

In accordance with certain embodiments of the invention, the at least one recessed portion may account for a recessed top plan area from about 10% to about 70% of the total top plan area of the nonwoven fabric, such as at most about any of the following: 70, 60, 50, 45, 40, 35, 30, 25, and 20% of the total top plan area of the nonwoven fabric and/or at least about any of the following: 10, 12, 14, 16, 18, 20, 22, 24, and 26% of the total top plan area of the nonwoven fabric. In this regard, a top plan view is an orthographic projection of a 3-dimensional object (e.g., the nonwoven fabric described and disclosed herein) from the position of a horizontal plane through the object. As used herein, for example, the recessed top plan area comprises the 2-D area of the total top plan area that is occupied or accounted for by the plurality of recessed portions.

In another aspect, the present invention provides a method of forming a nonwoven fabric. In accordance with certain embodiments of the invention, the method may comprise the following: (ia) forming or providing a carded web comprising a blend of fibers comprising (a) post-consumer recycled polymer staple fibers (PCR-staple fibers) and (b) one or more additional fibers, in which the one or more additional fibers is different from the PCR-staple fibers; or (ib) forming or providing a first layer of post-consumer recycled polymer staple fibers (PCR-staple fibers) and forming or providing a second layer of one or more additional fibers, in which the first layer and the second layer are adjacent to provide a multilayer nonwoven web; and (ii) mechanically entangling the PCR-staple fibers and the one or more additional fibers to define a nonwoven fabric as described and disclosed herein.

Figure 3:
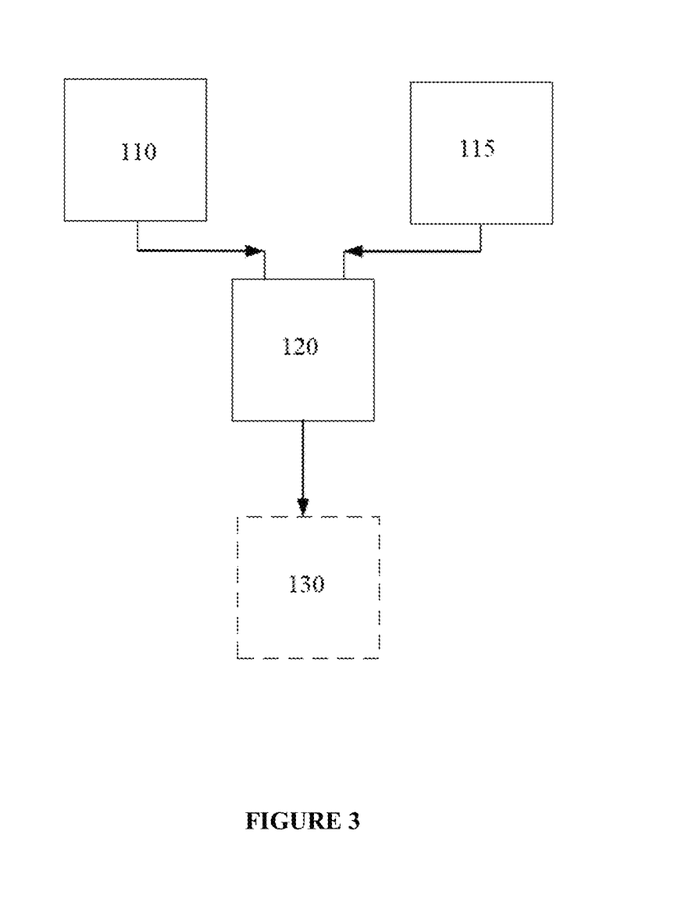
FIG. 3 illustrates a flow diagram for methods of making a nonwoven fabric in accordance with certain embodiments of the invention.

FIG. 3 illustrates a flow diagram for methods of making a nonwoven fabric in accordance with certain embodiments of the invention. As shown in FIG. 3, the method may comprise a first step option 'a' 110 that comprises forming or providing a carded web comprising a blend of fibers comprising (a) post-consumer recycled polymer staple fibers (PCR-staple fibers) and (b) one or more additional fibers, in which the one or more additional fibers is different from the PCR-staple fibers. Alternatively, the method may comprise a first step option 'b' 115 comprising forming or providing a first layer of post-consumer recycled polymer staple fibers (PCR-staple fibers) and forming or providing a second layer of one or more additional fibers, in which the first layer and the second layer are adjacent to provide a multilayer nonwoven web. The method may also include a subsequent step of mechanically entangling the PCR-staple fibers and the one or more additional fibers to define a nonwoven fabric as described and disclosed herein. In accordance with certain embodiments of the invention, the step of mechanically entangling may comprises hydroentangling to form a hydroentangled nonwoven fabric, needle-punching, and/or air-entangling. Optionally, the method may include a coating step 130 comprising the application of a binder and/or an antimicrobial agent.

In accordance with certain embodiments of the invention, in which a multilayer nonwoven web is formed, the multilayer nonwoven web may comprise a first layer of the PCR-staple fibers, and a second layer of the one or more additional fibers comprising wettable staple fibers, bicomponent staple fibers, microfiber staple fibers, cellulosic fibers, meltblown fibers, continuous fibers, or any combination thereof. In accordance with certain embodiments of the invention, the method may also comprise forming or providing a third layer comprising a nonwoven web or nonwoven fabric of continuous fibers, such as spunbond fibers, and mechanically entangling the continuous fibers with the PCR-staple fibers and the one or more additional fibers.

In accordance with certain embodiments of the invention, a carded web comprising the blend of fibers comprises PCR-staple fibers, and the one or more additional fibers comprising wettable staple fibers, bicomponent staple fibers, microfiber staple fibers, cellulosic fibers, meltblown fibers, continuous fibers, or any combination thereof is mechanically entangled to form a nonwoven fabric as described and disclosed herein.

In accordance with certain embodiments of the invention, the method may further comprise imparting a three-dimensional image into at least a first outermost surface of the nonwoven fabric. For instance, the method may further comprise imparting a three-dimensional image onto or in at least one surface of the nonwoven fabric. The method, for example, may comprise positioning a first outermost surface of the nonwoven fabric directly or indirectly onto an image transfer device having a three-dimensional pattern and applying jets of fluid directly or indirectly to a second outermost surface of the nonwoven fabric to impart a three-dimensional pattern onto the nonwoven fabric. For example, according to certain embodiments of the invention, the image transfer device may comprise one or more drums or even one or more sleeves affixed to a corresponding drum. One or more water jets, for example, high pressure water jets according to certain embodiments of the invention, may be applied to a side of the nonwoven opposite to the side contacting the image transfer device. Without intending to be bound by the theory, the one or more water jets and water directed through the nonwoven fabric causes the fibers of the nonwoven fabric to become displaced according to the image on the image transfer device such as the image formed on one or more drums or one or more sleeves affixed to a corresponding drum causing a three-dimensional pattern to be imaged throughout the nonwoven fabric according to such image. Such imaging techniques are further described in, for example, U.S. Pat. Nos. 6,314,627 entitled "Hydroentangled Fabric having Structured Surfaces"; 6,735,833 entitled "Nonwoven Fabrics having a Durable Three-Dimensional Image"; 6,903,034 entitled "Hydroentanglement of Continuous Polymer Filaments"; 7,091,140 entitled "Hydroentanglement of Continuous Polymer Filaments"; and 7,406,755 entitled "Hydroentanglement of Continuous Polymer Filaments", each of which are included in their entirety herein by reference. In accordance with certain embodiments of the invention, the three-dimensional pattern, for example, may comprise at least one (e.g., a plurality) recessed portion configured to facilitate the capture of loose debris on a surface to be cleaned and/or sanitized.

EXAMPLES

The present disclosure is further illustrated by the following examples, which in no way should be construed as being limiting. That is, the specific features described in the following examples are merely illustrative and not limiting.

Test Methods

'Basis Weight' is reported in ounces-per-square-yard (osy) and was measured according to Berry TM-7027.

'Bulk' is reported in mils or inches and was measured according to Berry TM-7015.

'Wet Machine-Direction Tensile Strength' is reported in lbs/in and was measured according to Berry TM-7012.

'Wet Machine-Direction Elongation' is reported in percent and was measured according to Berry TM-7012.

'Wet Cross-Direction Tensile Strength' is reported in lbs/inch and was measured according to Berry TM-t012.

'Wet Cross-Direction Elongation' is reported in percent and was measured according to Berry TM-7012.

'Absorption Time' is reported in seconds and was measured according to Berry TM-7023.

'Absorption Capacity' is reported in percent and was measured according to Berry TM-7023.

'Wet Mullen Burst' is reported in psi and was measured according to Berry TM-7014.

'Softness' is reported in grams and was measured according to Berry TM-7009.

'Wash Durability' is reported as number of cycles and was measured according to Berry TM-7032.

'Color L' is reported as number and was measured according to Berry TM-7010.

'Color a' is reported as number and was measured according to Berry TM-7010.

'Color b' is reported as number and was measured according to Berry TM-7010.

'Taber' is reported as number of cycles and was measured according to Berry TM-7042.

'Squeeze Test' is reported as Pass/Fail and was measured according to Berry TM-7715.

'Rub Test' is reported as Pass/Fail and was measured according to Berry TM-7715.

'Wet Crock' is reported as rating (number) and was measured according to Berry TM-7035.

Example Set 1

A control nonwoven fabric was formed (i.e., 6194 Control) and had a basis weight of 1.8 ounces per square yard (osy). The control nonwoven fabric comprised 47% by weight of PET staple fibers (0.85 osy), 47% by weight of wettable PET staple fibers (0/85 osy), and 6% by weight of a binder (0.1 osy). The binder was a non-ionic, self-cross-linking, vinyl acrylic emulsion (i.e., Sunbond 140N from Omnova Solutions (USA)).

A first example nonwoven fabric (i.e., DE1036A) was formed in an identical manner as the control nonwoven fabric except the PET staple fibers were replaced with PCR-PET staple fibers from Kilop (USA).

A second example nonwoven fabric (i.e., DE1038A) was formed in an identical manner as the control nonwoven fabric except the PET staple fibers were replaced with PCR-PET staple fibers from Stein Fibers (USA).

Tables 1 and 2 provide a summary of the physical properties of the control nonwoven fabric and each of the example nonwoven fabrics.

TABLE 1

| Product ID | 6194 spec | Full Weight | Section Weight | Bulk | Wet Grab MDT | Wet Grab MDE | Wet Grab CDT | Wet Grab CDE | Abs Time | Abs Cap |
|---|---|---|---|---|---|---|---|---|---|---|
| | Target | 1.80 | 1.80 | 31.0 | 32.0 | 45 | 16.0 | 135 | 2.0 | 1080 |
| | Avg Min | 1.60 | 1.60 | 25.0 | 18.0 | — | 10.0 | | — | 780 |
| | Avg Max | 2.05 | 2.05 | 37.0 | — | 80 | — | 190 | 6.0 | — |
| 6194 Control | | 1.87 | 1.86 | 30.0 | 33.90 | 51.15 | 15.28 | 98.90 | 1.44 | 1177 |
| | | | 1.87 | 29.0 | 29.40 | 47.15 | 17.31 | 92.40 | | |
| | | | 1.84 | 29.5 | 35.21 | 52.40 | 18.41 | 90.90 | | |
| | | | 1.91 | 30.0 | 35.28 | 52.90 | 18.04 | 81.40 | | |
| Avg | | 1.87 | 1.87 | 29.63 | 33.45 | 50.90 | 17.26 | 90.90 | 1.44 | 1177.00 |
| DE1036A-Kilop PCR-PET | | 1.73 | 1.75 | 30.5 | 28.87 | 48.90 | 17.66 | 90.65 | 1.87 | 1297 |
| | | | 1.67 | 33.0 | 30.21 | 49.15 | 20.04 | 91.90 | | |
| | | | 1.74 | 32.0 | 28.93 | 48.65 | 19.62 | 91.90 | | |
| | | | 1.74 | 31.0 | 27.18 | 53.90 | 18.59 | 90.65 | | |
| Avg | | 1.73 | 1.73 | 31.63 | 28.80 | 50.15 | 18.98 | 91.28 | 1.87 | 1297.00 |
| DE1038A-Stein PCR-PET | | 1.73 | 1.73 | 24.0 | 31.96 | 35.65 | 13.14 | 82.90 | 1.37 | 960 |
| | | | 1.74 | 25.0 | 32.68 | 35.65 | 14.24 | 88.15 | | |
| | | | 1.76 | 24.0 | 33.91 | 35.90 | 13.64 | 97.40 | | |
| | | | 1.70 | 25.0 | 32.14 | 34.90 | 13.49 | 96.40 | | |
| Avg | | 1.73 | 1.73 | 24.50 | 32.67 | 35.53 | 13.63 | 91.21 | 1.37 | 960.00 |

TABLE 2

| Product ID | Wet Mullen Burst | Softness (MD) | Wash Durability | Color L | Color a | Color b | Taber | Squeeze Test | Rub Test | Wet Crock |
|---|---|---|---|---|---|---|---|---|---|---|
| | 50 | 133 | 20 | 86.0 | 3.4 | 24.0 | 100 | STD | STD | 5.0 |
| | 30 | — | 5 | 80.0 | 0.9 | 18.0 | 80 | — | — | 3.5 |
| | — | 195 | — | 92.0 | 5.9 | 30.0 | — | — | — | — |
| 6194 Control | 48.0 | 151 | 20 cylces ok | 85.05 | 2.97 | 22.22 | 100 | std | std | 4.0 |
| | 48.0 | 131 | | | | | 90 | | | |
| | 48.0 | 161 | | | | | 80 | | | |
| | 49.0 | 144 | | | | | 80 | | | |
| Avg | 48.25 | 146.75 | 20 | 85.05 | 2.97 | 22.22 | 87.50 | std | std | 4.00 |
| DE1036A-Kilop PCR-PET | 46.0 | 128 | 20 cylces ok | 81.75 | 0.44 | 20.81 | 80 | | | 4.0 |
| | 48.0 | 129 | | | | | 100 | | | |
| | 47.0 | 134 | | | | | 65 | | | |
| | 46.0 | 139 | | | | | 70 | | | |
| Avg | 46.75 | 132.50 | 20 | 81.75 | 0.44 | 20.81 | 78.75 | std | std | 4.00 |
| DE1038A-Stein PCR-PET | 46.0 | 157 | 20 cylces ok | 81.46 | −11.00 | 16.94 | 100 | std | std | 4.0 |
| | 47.0 | 162 | | | | | 80 | | | |
| | 47.0 | 148 | | | | | 100 | | | |
| | 47.0 | 159 | | | | | 100 | | | |
| Avg | 46.75 | 156.50 | 20 | 81.46 | −11.00 | 16.94 | 95.00 | std | std | 4.00 |

Example Set 2

A control nonwoven fabric was formed (i.e., 6198 Control) and had a basis weight of 1.2 ounces per square yard (osy). The control nonwoven fabric comprised 46.7% by weight of PET staple fibers (0.56 osy), 46.7% by weight of wettable PET staple fibers (0.56 osy), and 6.7% by weight of a binder (0.08 osy). The binder was a non-ionic, self-crosslinking, vinyl acrylic emulsion (i.e., Sunbond 140N from Omnova Solutions (USA)).

A first example nonwoven fabric (i.e., DE1036B) was formed in an identical manner as the control nonwoven fabric except the PET staple fibers were replaced with PCR-PET staple fibers from Kilop (USA).

A second example nonwoven fabric (i.e., DE1038B) was formed in an identical manner as the control nonwoven fabric except the PET staple fibers were replaced with PCR-PET staple fibers from Stein Fibers (USA).

Tables 3 and 4 provide a summary of the physical properties of the control nonwoven fabric and each of the example nonwoven fabrics.

TABLE 3

| Product ID | 6198 spec | Full Weight | Section Weight | Bulk | Wet Grab MDT | Wet Grab MDE | Wet Grab CDT | Wet Grab CDE | Abs Time | Abs Cap |
|---|---|---|---|---|---|---|---|---|---|---|
| | Target | 1.20 | 1.20 | 27.0 | 21.0 | 51 | 10.0 | 143 | 2.0 | 1400 |
| | Avg Min | 1.00 | 1.00 | 20.0 | 15.0 | — | 6.0 | — | — | 900 |
| | Avg Max | 1.45 | 1.45 | 29.0 | — | 80 | — | 200 | 5.0 | — |
| 6198 Control | | 1.20 | 1.21 | 26.0 | 20.06 | 46.90 | 12.54 | 98.65 | 1.62 | 1536 |
| | | | 1.17 | 26.0 | 19.47 | 46.90 | 15.60 | 91.40 | | |
| | | | 1.19 | 27.0 | 18.03 | 40.40 | 12.38 | 92.40 | | |
| | | | 1.21 | 26.0 | 16.91 | 45.65 | 13.08 | 94.15 | | |
| Avg | | 1.20 | 1.20 | 26.25 | 18.62 | 44.96 | 13.40 | 94.15 | 1.62 | 1536.00 |
| DE1036B-Kilop PCR-PET | | 1.18 | 1.20 | 30.0 | 14.15 | 43.65 | 12.02 | 96.90 | 2.06 | 1785 |
| | | | 1.18 | 30.0 | 14.86 | 41.40 | 10.97 | 103.15 | | |
| | | | 1.17 | 29.0 | 12.09 | 35.40 | 9.08 | 113.15 | | |
| | | | 1.18 | 26.0 | 11.45 | 38.65 | 9.55 | 106.90 | | |
| Avg | | 1.18 | 1.18 | 28.75 | 13.14 | 39.78 | 10.41 | 105.03 | 2.06 | 1785.00 |
| DE1038B-Stein PCR-PET | | 1.22 | 1.23 | 23.0 | 18.47 | 33.90 | 8.84 | 95.90 | 1.50 | 1338 |
| | | | 1.22 | 23.0 | 22.89 | 39.65 | 8.97 | 81.40 | | |
| | | | 1.20 | 24.0 | 18.83 | 29.90 | 11.37 | 91.40 | | |
| | | | 1.23 | 22.0 | 17.68 | 29.40 | 12.08 | 96.15 | | |
| Avg | | 1.22 | 1.22 | 23.00 | 19.47 | 33.21 | 10.32 | 91.21 | 1.50 | 1338.00 |

TABLE 4

| Product ID | Abs Cap | Wet Mullen Burst | Softness (MD) | Wash Durability | Color L | Color a | Color b | Taber | Squeeze Test |
|---|---|---|---|---|---|---|---|---|---|
| | 1400 | 38 | 80 | 20 | 9.36 | 0.8 | −8.0 | 100 | STD |
| | 900 | 20 | — | 5 | 91.6 | 0.0 | −10.0 | 75 | — |
| | — | — | 120 | — | 95.6 | 1.6 | —6.0 | — | — |
| 6198 Control | 1536 | 38.0 | 61.0 | 20 cycles ok | 93.17 | 1.02 | —9.75 | 60 | std |
| | | 40.0 | 61.0 | | | | | 80 | |
| | | 38.0 | 57.0 | | | | | 80 | |
| | | 38.0 | 47.0 | | | | | 60 | |

TABLE 4-continued

| Product ID | Abs Cap | Wet Mullen Burst | Softness (MD) | Wash Durability | Color L | Color a | Color b | Taber | Squeez Test |
|---|---|---|---|---|---|---|---|---|---|
| Avg | 1536.0 | 38.50 | 56.50 | 20 | 93.17 | 1.02 | −9.75 | 70.00 | std |
| DE1036B - Kilop PCR-PET | 1785 | 34.0 | 59.0 | 20 cycles ok | 88.90 | −0.04 | −6.10 | 50 | std |
| | | 32.0 | 54.0 | | | | | 40 | |
| | | 28.0 | 56.0 | | | | | 35 | |
| | | 32.0 | 49.0 | | | | | 40 | |
| Avg | 1785.00 | 31.50 | 54.50 | 20 | 88.90 | −0.04 | −6.10 | 41.25 | std |
| DE1038B-Stein PCR-PET | 1338 | 36.0 | 57.0 | 20 cycles ok | 87.07 | 0.16 | −8.27 | 85 | std |
| | | 38.0 | 50.0 | | | | | 85 | |
| | | 38.0 | 60.0 | | | | | 75 | |
| | | 36.0 | 60.0 | | | | | 80 | |
| Avg | 1338.0 | 37.00 | 56.75 | 20 | 87.07 | 35.53 | −8.27 | 81.25 | std |

Example Set 3

A control nonwoven fabric was formed (i.e., M165 Control) and had a basis weight of 2.1 ounces per square yard (osy). The control nonwoven fabric comprised 57% by weight of rayon fibers (1.22 osy), 34.7% by weight of PET staple fibers (0.73 osy), and 6.7% by weight of a binder (0.15 osy). The binder was an anionic, self-crosslinking, vinyl acrylic emulsion (i.e., Dur-O-Set E-646 from Celanese (USA)). An antimicrobial (i.e., Microban Z06 from Microban (USA))

A first example nonwoven fabric (i.e., DE1036C) was formed in an identical manner as the control nonwoven fabric except the PET staple fibers were replaced with PCR-PET staple fibers from Kilop (USA).

A second example nonwoven fabric (i.e., DE1038C) was formed in an identical manner as the control nonwoven fabric except the PET staple fibers were replaced with PCR-PET staple fibers from Stein Fibers (USA).

Tables 5 and 6 provide a summary of the physical properties of the control nonwoven fabric and each of the example nonwoven fabrics.

TABLE 5

| Product ID | M165 spec | Full Weight | Section Weight | Bulk | Wet Grab MDT | Wet Grab MDE | Wet Grab CDT | Wet Grab CDE | Abs Time | Abs Cap |
|---|---|---|---|---|---|---|---|---|---|---|
| | Target | 2.10 | — | 27 | 18.0 | 40 | 13.0 | 80 | 3.0 | 950 |
| | Avg Min | 1.83 | — | 20 | 12.0 | | 8.0 | | — | 700 |
| | Avg Max | 2.37 | — | 34 | — | 60 | — | 120 | 5.0 | — |
| M165 Control | 2.18 | 2.21 | 25.0 | 21.84 | 30.90 | 11.83 | 76.40 | 3.00 | 963 |
| | | 2.17 | 26.0 | 22.47 | 32.90 | 12.03 | 81.65 | | |
| | | 2.15 | 25.0 | 22.79 | 34.40 | 11.68 | 76.15 | | |
| | | 2.17 | 26.0 | 23.52 | 32.40 | 11.46 | 76.15 | | |
| Avg | 2.18 | 2.18 | 25.50 | 22.66 | 32.65 | 11.75 | 77.59 | 3.00 | 963.00 |
| DE1036C-Kilop PCR-PET | 2.25 | 2.23 | 26.0 | 21.38 | 25.15 | 10.86 | 66.40 | 3.06 | 905 |
| | | 2.23 | 27.0 | 22.71 | 28.90 | 11.58 | 70.65 | | |
| | | 2.21 | 27.0 | 22.51 | 28.15 | 10.82 | 81.40 | | |
| | | 2.32 | 27.0 | 23.74 | 33.65 | 9.93 | 70.90 | | |
| Avg | 2.25 | 2.25 | 26.75 | 22.59 | 28.96 | 10.80 | 72.34 | 3.06 | 905.00 |
| DE1038C-Stein PCR-PET | 2.10 | 2.07 | 22.0 | 17.28 | 14.65 | 13.02 | 78.90 | 3.75 | 792 |
| | | 2.06 | 22.0 | 15.63 | 10.60 | 10.80 | 70.15 | | |
| | | 2.12 | 22.0 | 17.17 | 10.15 | 9.88 | 65.15 | | |
| | | 2.15 | 23.0 | 17.07 | 15.15 | 10.96 | 71.15 | | |
| Avg | 2.10 | 2.10 | 22.25 | 16.79 | 12.64 | 11.17 | 71.34 | 3.75 | 792.00 |

TABLE 6

| Product ID | Wet Mullen Burst | Softness (MD) | Wash Durability | Color L | Color b | Taber | Squeeze Test | Rub Test |
|---|---|---|---|---|---|---|---|---|
| | 36.0 | 114 | 15 | 67.0 | −28.0 | 100 | STD | STD |
| | 30.0 | 150 | 5 | 63.0 | −35.0 | 25 | — | — |
| | — | 160 | — | 71.0 | −21.6 | — | — | — |
| M165 Control | 36.0 | 144 | 15 cycles Ok | 88.50 | −12.90 | 100 | std | std |
| | 32.0 | 136 | | | | 100 | | |
| | 33.0 | 141 | | | | 100 | | |
| | 36.0 | 143 | | | | 100 | | |
| Avg | 34.25 | 141.00 | 15.00 | 88.50 | −12.90 | 100.00 | std | std |
| DE1036C-Kilop PCR-PET | 36.0 | 143 | 15 cycles Ok | 86.24 | −6.27 | 100 | std | std |
| | 36.0 | 161 | | | | 100 | | |
| | 36.0 | 181 | | | | 100 | | |
| | 35.0 | 152 | | | | 100 | | |
| Avg | 35.75 | 159.25 | 15.00 | 86.24 | −6.27 | 100.00 | std | std |
| DE1038C- | 34.0 | 189 | 15 cycles | 83.97 | −11.63 | 100 | std | std |

TABLE 6-continued

| Product ID | Wet Mullen Burst | Softness (MD) | Wash Durability | Color L | Color b | Taber | Squeeze Test | Rub Test |
|---|---|---|---|---|---|---|---|---|
| Stein PCR-PET | 22.0 | 168 | Ok | | | 100 | | |
| | 26.0 | 172 | | | | 100 | | |
| | 27.0 | 167 | | | | 100 | | |
| Avg | 27.25 | 174.00 | 15.00 | 83.97 | −11.63 | 100.00 | std | std |

Example Set 4

A control nonwoven fabric was formed (i.e., 6186 Control) and had a target basis weight of 2.1 ounces per square yard (osy). The control nonwoven fabric comprised 66% by weight of rayon fibers (1.39 osy), 25% by weight of PET staple fibers (0.53 osy), and 9% by weight of a binder (0.18 osy). The binder was a cationic, self-crosslinking, ethylene vinyl acetate emulsion (i.e., Unibond 2850).

A first example nonwoven fabric (i.e., DE1036D) was formed in an identical manner as the control nonwoven fabric except the PET staple fibers were replaced with PCR-PET staple fibers from Kilop (USA).

A second example nonwoven fabric (i.e., DE1038D) was formed in an identical manner as the control nonwoven fabric except the PET staple fibers were replaced with PCR-PET staple fibers from Stein Fibers (USA).

Tables 7 and 8 provide a summary of the physical properties of the control nonwoven fabric and each of the example nonwoven fabrics.

TABLE 7

| Product ID | 6186 spec | Full Weight | Section Weight | Bulk | Wet Grab MDT | Wet Grab CDT | Wet Grab CDE | Abs Time | Abs Cap |
|---|---|---|---|---|---|---|---|---|---|
| | Target | 2.10 | — | 0.024 | 15.8 | 11.9 | 108 | 7.0 | 915 |
| | Avg Min | 1.83 | — | 0.018 | 8.0 | 6.0 | | — | 700 |
| | Avg Max | 2.37 | — | 0.030 | — | — | 160 | 25.0 | — |
| 6186 Control | | 2.40 | 2.43 | 0.025 | 14.05 | 7.31 | 78.40 | 2.81 | 954 |
| | | | 2.38 | 0.027 | 14.71 | 8.90 | 90.65 | | |
| | | | 2.42 | 0.026 | 14.01 | 7.68 | 93.15 | | |
| | | | 2.36 | 0.027 | 14.20 | 8.99 | 101.65 | | |
| Avg | | 2.40 | 2.40 | 0.026 | 14.24 | 8.22 | 90.96 | 2.81 | 954.00 |
| DE1036D-Kilop PCR-PET | | 2.19 | 2.20 | 0.026 | 14.81 | 8.87 | 90.15 | 3.37 | 990 |
| | | | 2.20 | 0.029 | 15.88 | 7.67 | 76.40 | | |
| | | | 2.23 | 0.029 | 15.86 | 6.62 | 85.40 | | |
| | | | 2.14 | 0.027 | 14.60 | 8.22 | 90.40 | | |
| Avg DE1038D-Stein PCR-PET | | 2.19 | 2.19 | 0.028 | 15.29 | 7.85 | 85.59 | 3.37 | 990.00 |
| | | 2.38 | 2.39 | 0.024 | 14.72 | 9.00 | 93.15 | 3.87 | 855 |
| | | | 2.33 | 0.025 | 14.52 | 6.91 | 102.40 | | |
| | | | 2.41 | 0.026 | 14.21 | 7.37 | 85.65 | | |
| | | | 2.39 | 0.024 | 13.94 | 8.04 | 82.90 | | |
| Avg | | 2.38 | 2.38 | 0.025 | 14.35 | 7.83 | 91.03 | 3.87 | 855.00 |

TABLE 8

| Product ID | Wet Mullen Burst | Softness (MD) | Wash Durability | Color L | Color b | Taber | Catonic Charge Stain Test | Squeeze Test | Rub Test | Wet Crock |
|---|---|---|---|---|---|---|---|---|---|---|
| | 28.0 | 95 | 10 | 55.0 | −34.3 | 100 | STD | STD | STD | 4.5 |
| | 21.0 | 27 | 5 | 48.0 | −43.3 | 30 | | — | — | 3.5 |
| | — | 160 | — | 62.0 | −25.3 | — | | — | — | — |
| 6186 Control | 32.0 | 144 | 10 cylces | 76.55 | 76.55 | 100 | | | | 4.50 |
| | 32.0 | 148 | ok | | | 100 | std | std | std | |
| | 32.0 | 130 | | | | 100 | | | | |
| | 32.0 | 136 | | | | 100 | | | | |
| Avg | 32.00 | 139.50 | 10 | 76.55 | 76.55 | 100.00 | std | std | std | 4.50 |
| DE1036D-Kilop PCR-PET | 32.0 | 139 | 10 cylces | 81.47 | −12.55 | 100 | | | | 4.00 |
| | 34.0 | 130 | ok | | | 100 | | | | |
| | 30.0 | 152 | | | | 100 | | | | |
| | 29.0 | 158 | | | | 100 | | | | |
| Avg | 31.25 | 144.75 | 10 | 81.47 | −12.55 | 100.00 | std | std | std | 4.00 |
| DE1038D-Stein PCR-PET | 32.0 | 176 | 10 cylces | 81.83 | −17.75 | 100 | | | | 4.50 |
| | 33.0 | 167 | ok | | | 100 | | | | |
| | 33.0 | 170 | | | | 100 | | | | |
| | 32.0 | 164 | | | | 100 | | | | |
| Avg | 32.50 | 169.25 | 10 | 81.83 | −17.75 | 100.00 | std | std | std | 4.50 |

Example Set 5

The control nonwoven fabric and each example nonwoven fabric from Example Set 1 were evaluated for their ability to prevent depletion of a control solution including a quat. The control solution had a concentration of 215 ppm. Each of the nonwoven fabrics were submerged within a respective disinfectant composition including a quat, in which the concentration of the quat was 215 ppm. The concentration of the respective disinfectant compositions was tested over the course of 96 hours as shown in Table 9. In this regard, each of the example nonwoven fabrics performed as well as the control nonwoven fabric. After 96 hours, for instance, all nonwoven fabrics merely depleted the quat concentration from 215 ppm to 200 ppm (e.g., a 7% reduction in quat concentration).

TABLE 9

| | Quat | | | |
|---|---|---|---|---|
| Time | Control Solution | 6194 Control | DE1036A - Kilop PCR-PET | DE1038A - Stein PCR-PET |
| 0 minutes | 215 | 194 | 184 | 184 |
| 15 minutes | 215 | 189 | 184 | 194 |
| 1 hour | 215 | 189 | 194 | 194 |
| 4 hours | 215 | 200 | 194 | 194 |
| 8 hours | 215 | 200 | 200 | 200 |
| 24 hours | 215 | 200 | 200 | 200 |
| 96 hours (4 days) | 215 | 200 | 200 | 200 |
| 0 minutes Quat Reduction (%) | | 10 | 14 | 14 |
| 15 minutes Quat Reduction (%) | | 12 | 14 | 10 |
| 1 hour Quat Reduction (%) | | 12 | 10 | 10 |
| 4 hours Quat Reduction (%) | | 7 | 10 | 10 |
| 8 hours Quat Reduction (%) | | 7 | 7 | 7 |
| 24 hours Quat Reduction (%) | | 7 | 7 | 7 |
| 96 hours Quat Reduction (%) | | 7 | 7 | 7 |

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:
a mechanically entangled blend of fibers comprising (a) post-consumer recycled polymer staple fibers (PCR-staple fibers) and (b) a plurality of wettable staple fibers having a hydrophilic coated thereon;
wherein the PCR-staple fibers are mechanically entangled with the a plurality of wettable staple fibers one of more additional fibers to define the nonwoven fabric.

2. The nonwoven of claim 1, wherein the PCR-staple fibers comprise a polyethylene terephthalate (PET), a polyolefin, or a polyamide.

3. The nonwoven of claim 2, wherein the PCR-staple fibers comprise a post-consumer recycled polyethylene terephthalate (PCR-PET).

4. The nonwoven of claim 1, wherein the PCR-staple fibers have one or more of (i) an average length from about 20 to about 150 mm, (ii) an average linear density from 1 to about 2.5 decitex (dtex), and (iii) an average from about 3 to about 20 crimps per 25 mm of length.

5. The nonwoven of claim 1, wherein the mechanically entangled blend of fibers further comprises bicomponent staple fibers, microfiber staple fibers, cellulosic fibers, meltblown fibers, continuous fibers, or any combination thereof.

6. The nonwoven fabric of 5, wherein the mechanically entangled blend of fibers comprises the PCR-staple fibers, the plurality of wettable staple fibers, and a plurality of cellulosic fibers, and wherein the nonwoven fabric comprises a component weight ratio between the PCR-staple fibers in grams per square meter of the nonwoven fabric, the plurality of wettable staple fibers in grams per square meter of the nonwoven fabric, and the plurality of cellulosic fibers in grams per square meter of the nonwoven fabric according to the formula A: B: C, wherein
(i) 'A' represents the PCR-staple fibers in grams per square meter of the nonwoven fabric and comprises a value from about 0.2 to about 0.8;
(ii) 'B' represents the plurality of wettable staple fibers in grams per square meter of the nonwoven fabric and comprises a value from about 0.2 to about 0.8; and
(iii) 'C' represents the plurality of cellulosic fibers in grams per square meter of the nonwoven fabric and comprises a value from about 0.2 to about 0.8.

7. The nonwoven fabric of claim 5, wherein the mechanically entangled blend of fibers includes the plurality of microfiber staple fibers, the plurality of microfiber staple fibers comprise natural fibers, synthetic fibers, or a combinations thereof; wherein the plurality of microfiber staple fibers comprise a denier value of 1 or less.

8. The nonwoven fabric of claim 1, wherein the PCR-staple fibers comprise from about 10% to about 90% by weight of the nonwoven fabric.

9. The nonwoven fabric of claim 1, wherein the plurality of wettable staple fibers comprise from about 10% to about 90% by weight of the nonwoven fabric, and wherein the nonwoven fabric has a first ratio between the PCR-staple fibers in grams per square meter of the nonwoven fabric and the plurality of wettable staple fibers in grams per square meter of the nonwoven fabric from about 4:1 to about 1:4.

10. The nonwoven fabric of claim 1, wherein the mechanically entangled blend of fibers further comprises a plurality of cellulosic fibers, the plurality of cellulosic fibers comprise from about 10% to about 90% by weight of the nonwoven fabric, and wherein the nonwoven fabric has a second ratio between the plurality of cellulosic fibers in grams per square meter of the nonwoven fabric and the PCR-staple fibers in grams per square meter of the nonwoven fabric from about 4:1 to about 1:4.

11. The nonwoven fabric of claim 1, wherein the mechanically entangled blend of fibers further comprises a plurality of bicomponent staple fibers, the plurality of bicomponent fibers comprise from about 10% to about 90% by weight of the nonwoven fabric.

12. The nonwoven fabric of claim 1, further comprising a binder.

13. The nonwoven fabric of claim 1, further comprising an antimicrobial compound.

14. The nonwoven fabric of claim 1, wherein the nonwoven fabric comprises a three-dimensional pattern formed on at least one surface of the nonwoven fabric, the three-dimensional pattern comprises at least one recessed portion and a plurality of raised portions.

15. The nonwoven fabric of claim 1, wherein the nonwoven fabric is provided in a form of a plurality of individual wipes disposed within a package.

\* \* \* \* \*

UNITED STATES PATENT AND TRADEMARK OFFICE
CERTIFICATE OF CORRECTION

PATENT NO. : 12,392,065 B2
APPLICATION NO. : 17/392309
DATED : August 19, 2025
INVENTOR(S) : Dianne B. Ellis Page 1 of 1

It is certified that error appears in the above-identified patent and that said Letters Patent is hereby corrected as shown below:

In the Claims

In Column 21, Claim 1, Lines 58-59, "staple fibers one of more additional fibers to define" should read --staple fibers to define--

Signed and Sealed this
Fourth Day of November, 2025

John A. Squires
*Director of the United States Patent and Trademark Office*